June 17, 1969 H. E. FERREE ET AL 3,450,962

PRESSURE ELECTRICAL CONTACT ASSEMBLY FOR A SEMICONDUCTOR DEVICE

Filed Feb. 1, 1966

United States Patent Office 3,450,962

Patented June 17, 1969

3,450,962

PRESSURE ELECTRICAL CONTACT ASSEMBLY FOR A SEMICONDUCTOR DEVICE

Herbert E. Ferree, Greensburg, and Raymond C. Doran, Jeannette, Pa., assignors to Westinghouse Electric Corporation, Pittsburgh, Pa., a corporation of Pennsylvania Filed Feb. 1, 1966, Ser. No. 524,125
Int. Cl. H01l 11/04
U.S. Cl. 317—235 8 Claims

ABSTRACT OF THE DISCLOSURE

A pressure electrical contact assembly comprising an electrical contact comprising a tubular section attached to an offset member which also acts as a thermal and mechanical stress relief member, and a gate contact extending the full length of the tubular section, and upon a portion of which a resilient force means disposed within the tubular section acts, provides a means for centering two electrical contacts on a semiconductor element of a compact high current controlled semiconductor device.

This invention relates to a pressure electrical contact assembly for a semiconductor device.

An object of this invention is to provide a new and improved pressure electrical contact assembly for use with a semiconductor in which an electrical device, in which one electrical lead passes entirely through a second electrical lead.

Another object of this invention is to provide a pressure electrical contact assembly in which a resilient means contained within a hollow electrical lead holds an electrical contact in an electrical and thermal conductive relationship with an electrical contact surface of a mating component.

Other objects of the invention will, in part, be obvious and will, in part, appear hereinafter.

For a better understanding of the nature and objects of of the present invention, reference should be had to the following detailed description and drawings in which.

In accordance with the present invention and in attainment of the foregoing objects, there is provided a pressure electrical contact assembly comprising a first electrical lead affixed to a first electrical contact, a second electrical lead affixed to a second electrical contact, at least one portion of said second electrical lead comprising a hollow member, the first lead passing through an aperture in one end of said hollow member, transversing the entire length of the hollow member, exiting through an aperture in the other end of the hollow member and terminating in the first electrical contact, and a resilient means disposed within the hollow member to act upon the first contact.

Figure 1:
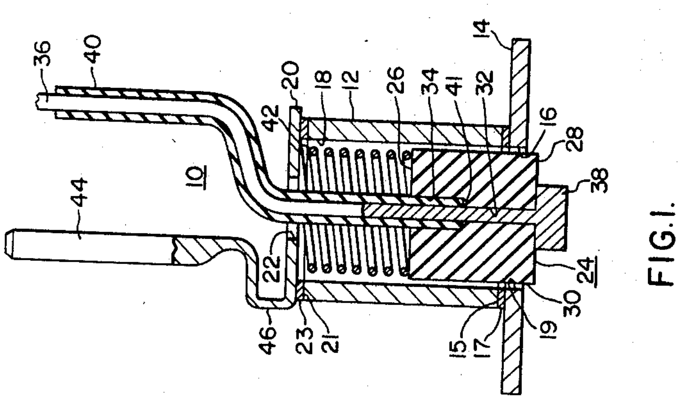
FIG. 1 is a view, partly in cross-section, of a pressure electrical contact assembly made in accordance with the teachings of this invention.

With reference to FIG. 1 there is shown a pressure electrical contact assembly 10 embodying the teachings of this invention and suitable for use with various semiconductor devices such, for example, as four-region switching devices and transistors.

The assembly 10 may be employed to make electrical contact to two separate regions of a semiconductor element.

The assembly 10 comprises a hollow electrically conductive member 12. The member 12 may be made of any suitable electrically conductive materials such, for example, as copper, aluminum, silver, base alloys thereof and the like. A washer-shaped member 14 is affixed to end 15 of the member 12 by a solder layer 17.

The member 14 has an axially disposed aperture 16, the peripheral wall 19 of which is a projected extension of an inner perepheral wall 18 of the member 12. The member 14 may be made of an electrical conductive material such, for example, as molybdenum, tantalum, tungsten, base alloys thereof and the like.

An electrically conductive plate member 20 is affixed to the end 21 of the member 12 by a solder layer 23. The plate member 20 has an aperture 22 contained therein.

It will be understood that the solders comprising layers 17 and 23 must be such that they will withstand the temperatures resulting from heat dissipation and electrical conduction during the operation of the semiconductor device. Hard solders having a melting point of at least 350° C. have been found suitable.

The aperture 22 in member 20 is centrally disposed relative to the hollow member 12. The member 20 may be made of any suitable electrically conductive material such, for exemple, as silver, copper, aluminum, base alloys thereof and the like.

A body 24 of electrically insulating material is disposed within the cavity defined by the inner peripheral wall 18 of the member 12. The body 24 has a top surface 26, a bottom surface 28 and a side surface 30, the outer periphery of body 24 conforms to the periphery of the wall 18 and the aperture 16 in member 14. There is an axially disposed aperture 32 extending through body 24. The aperture 32 in body 24 is centrally disposed relative to the hollow member 12. The aperture 32 has a portion 34 of increased cross-section relative to the remainder of the aperture 6 located in an upper portion of the body 24.

The body 24 may be made of an insulating material such, for example, as alumina, fluorocarbons, such as polytetrafluoroethylene and polytrifluoromonochloroethylene, electrically non-conductive resinous materials such, for example as an epoxy resin.

An electrically conductive lead 36 is disposed within the aperture 32 of the body 24. The lead 36 terminates at an integral nail head contact 38 on the bottom surface 28 of body 24 and extends through the aperture 22 of the member 20.

The lead 36 may be made of an electrically conductive metal such, for example, as silver, copper, aluminum, base alloys thereof and the like.

A jacket 40 of electrically insulating material is disposed about, and encloses at least that portion of the lead 36 which extends beyond body 24. End 41 of the jacket 40 extend into the enlarged section 34 of the aperture 32 in body 24.

The material comprising the jacket 40 is an electrical insulating material such, for example, as polytetrafluoroethylene, polytrifluoromonochloroethylene silicone rubber and the like.

A coil spring 42 is disposed within the cavity defined by inner wall 18 of the member 12 between, and in contact with, the plate member 20 and the top surface 26 of the body 24. The spring 42, when compressed, maintains an almost constant pressure through body 24 on the nail head contact 38 to assure a good electrical connection when it is in contact with an electrical connection external to the assembly 10.

A second electrical lead 44 is incorporated as an integral part of the plate member 20. The material comprising the electrical lead 44 is the same as the material comprising the member 20. The lead 44 preferably incorporates some means of offset or stress relief such as a bent portion 46. The bent portion 46 permits both thermal and mechanical stresses occurring in the lead 44 and the member 20 during normal operation of the assembly 10 to be properly compensated for without damaging a body of semiconductor material in compressive contact with the member 14 and the nail head contact 38.

The assembly 10 is particularly suited for use with a semiconductor device which utilizes a control lead in addition to the two major leads. In such devices, the lead 36 is connected to the control contact. The assembly 10 is also suitable for use in compression bonded encapsulated electrical devices wherein the case member of the device is both a part of the hermetic enclosure for the device as well as a component cooperating with a resilient means for holding a semi-conductor element in good electrical and thermal contact with a base member and at least one other electrical conductor.

The bent portion 46 of lead 44 permits electrical contact surfaces to be centered on a semiconductor device while permitting the electrical lead 44 to be offset from the vertical central axis of the device. The lead 44, when assembled into a ceramic-to-metal seal of a header portion of a hermetic enclosure, must be offset to provide the longest minimum electrical leakage path over the ceramic for the available surface area of the header.

Figure 2:
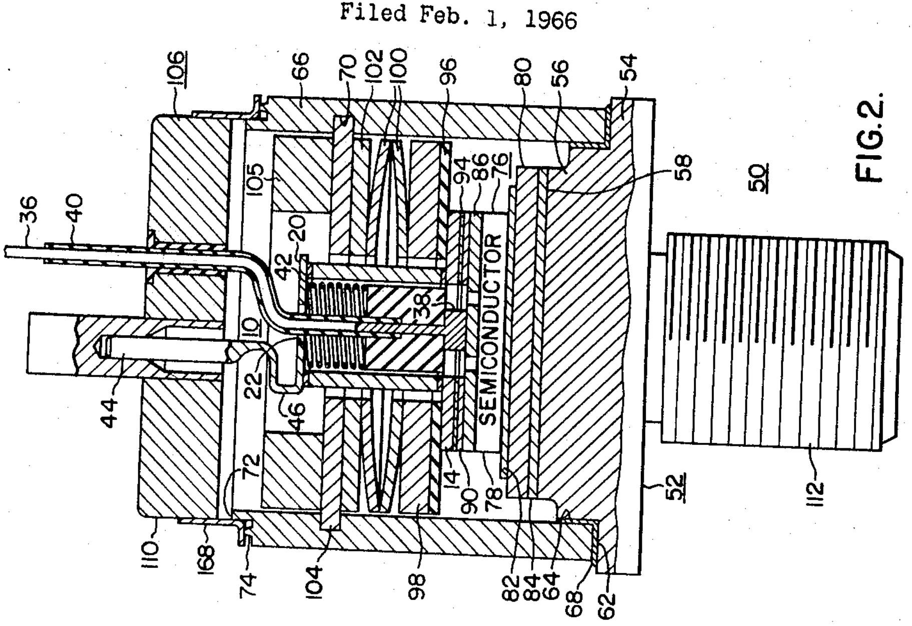
FIG. 2 is a view, partly in cross-section, of a compact high-current controlled semiconductor device embodying a pressure electrical contact assembly made in accordance with the teachings of this invention.
Figure 3:
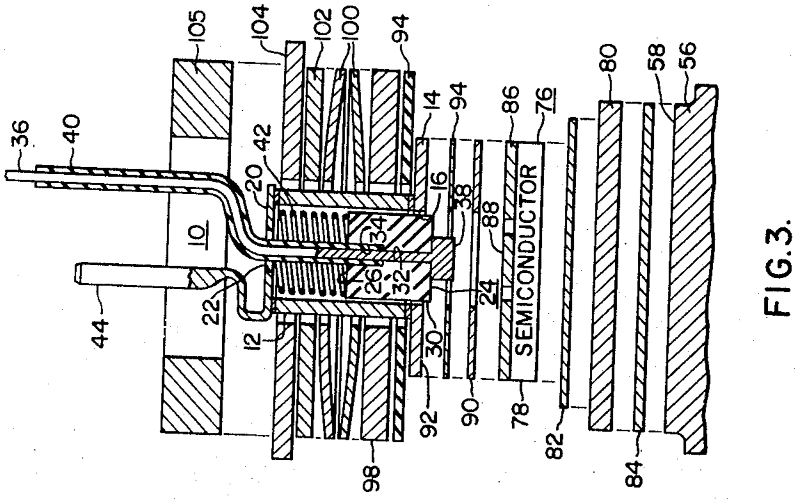
FIG. 3 is an exploded view, partly in cross-section, detailing more specifically a portion of the device of FIG. 2.

To more particularly describe the invention, there is shown in FIGS. 2 and 3 a controlled semiconductor device 50 incorporating the assembly 10 of this invention.

The device 50 comprises a good electrically and thermally conductive support member 52. The support member 52 is comprised of a peripheral flange 54 and an upwardly extending pedestal portion 56. The upwardly extending pedestal portion 56 has an uppermost mounting surface 58. The peripheral flange 54 has a top surface 62 and the upwardly extending pedestal portion 56 has a peripheral side surface 54.

The support member 52 is made of a metal selected from the group consisting of copper, silver, aluminum, base alloys thereof and ferrous base alloys. Copper and brass, a base alloy of copper, have been found particularly satisfactory for this purpose.

An upwardly extending hollow cylindrical member 66 is affixed to the support member 52. The inner periphery of the member 66 conforms to the peripheral surface 64 of the pedestal portion 56. The member 66 is affixed to the support member 52 by any suitable means known to those skilled in the art, such, for example, as by disposing a suitable braze material 68 between the top surface 62 and the side surface 64 of the support member 52 and a portion of the inner periphery and all of the bottom of the cylindrical member 66.

An annular groove 70, formed in the wall of the inner periphery of the cylindrical member 66, is located remote from the end joined to the support member 52. An upwardly extending integral flange 72 is formed about the upper end of the inner periphery. An annular weld ring 74 is formed in the upper surface of the member 66.

The cylindrical member 66 is preferably made of a ferrous base material although other suitable materials, particularly metals, may be employed.

A semiconductor contact assembly 76 is disposed upon the uppermost mounting surface 58 of the upwardly extending pedestal portion 56 of the support member 52. The assembly 76 comprises a semiconductor element 78 and a first electrical contact 80.

The semiconductor element 78 may be either of the PNPN or the NPNP configuration.

Electrical contact 80 comprises a metal such, for example, as molybdenum, tungsten, tantalum and combinations and base alloys thereof.

Although not required, the semiconductor element 78 is preferably joined to the first electrical contact 80 by a suitable prior joining operation. The joining of the semiconductor element 78 to the contact 80 may utilize a layer 82 of any suitable "hard" or "soft" solder known to those skilled in the art.

The solder layer 82 may comprise a suitable solder such, for example, as a silver or a gold base solder, having a melting point above 350° C. and known to those skilled in the art as a "hard" solder. A solder having a melting point below about 350° C., and known to those skilled in the art as a "soft" solder, may also be used. Such "soft" solders are usually, but need not be, lead base solders.

It will be understood, of course, that the particular type of solder will depend on the anticipated operating temperature range of the finished device 50.

The electrical contact 80 is separated from the uppermost mounting surface 58 of the upwardly extending pedestal portion of the support member 52 by a non-reactive, malleable, electrically and thermally conductive layer 84. The layer 84 comprises a metal selected from the group consisting of gold, silver, tin and aluminum. The layer 84 compensates for any surface irregularities which may occur on the surface 58. The layer 84 may be deposited upon the surface 58 by any suitable means known to those skilled in the art such, for example, as electrodeposition means, or as a preformed disc of a suitable metal affixed to the surface 58 and then contoured to specific requirements.

A contact layer 86 of a suitable material such, for example, as a gold alloy, is provided by any of the methods known to those skilled in the art on the upper surface of the element 78 thereby providing a cathode contact. A gate, or a control electrode, contact 88 is also provided on the upper surface of the element 78. The gate contact 88 may be the same material comprising the contact layer 86.

An electrically and thermally conductive washer 90 comprising a metal selected from the group consisting of gold, silver, tin and aluminum is affixed to a bottom surface 92 of the member 14. The washer 90 compensates for any surface irregularities which may occur on the bottom surface 92. The washer 90 is affixed to the member by a suitable "hard" or "soft" solder layer 94 depending on the operating temperature range of the device 50. The layer 94 comprises the same material as described heretofore as comprising the layer 82.

The pressure electrical contact asembly 10 is disposed on the semiconductor contact assembly 76 in such a manner that the washer 90 is electrically connected to the contact 86 and the nail head contact 38 of the electrical lead 36 is electrically connected to the gate contact 88.

It is important that the surfaces betwen the first electrical contact 80 and the layer 86, as well as the surface between the member 14, the washer 90 and the semiconductor element contact assembly 76, be flat and planar so that no uneven pressures develop when compressed together.

An apertured electrically insulating washer 96 is disposed about the hollow electrical conductor 12 and on top of the member 14. The insulating washer 96 comprises a material selected from the group consisting of ceramic, mica, glass, quartz and fluorocarbon.

A first apertured thrust washer 98 is disposed about the member 12 and upon the top surface of the apertured insulating washer 96. At least one apertured spring washer 100 is disposed about the number 12 and upon the top surface of the apertured thrust washer 98. A second apertured thrust washer 102 is disposed about the member 12 and on top of the spring washer 100.

An apertured expandable metal retaining ring 104, similar to the snap ring, is disposed about the member 12 and within, and is retained by, the groove 70 formed in the inner periphery of the upwardly extending cylindrical member 66. The ring 104, cooperating with the cylindrical member 66 and the second thrust washer 102, resiliently urges the apertured spring washer 100 to transmit a compression force through the second apertured thrust washer 98 and thence through the apertured electrically insulating washer 96 to force the member 14, the semiconductor assembly 76, the first electrical contact 80 and the uppermost mounting surface 58 of the upwardly extending pedestal portion 56 of the support member 52 into a firm, intimate, electrically conductive relationship with each other.

Simultaneously, a firm, intimate, electrically conductive relationship is formed between the nail head contact 38 of the lead 36, the semiconductor assembly 76, the first electrical contact 80 and the uppermost mounting surface 58. A good electrical contact is maintained between the lead 36 and the assembly 76 by the coil spring 42 acting on the body 24 and resiliently urging the nail head contact 38 against the gate contact 88 of the element 76.

More than one apertured spring washer 100 of the same or different thickness may be required to cooperate with the retaining ring 104 and the cylindrical member 66 to create the necessary compressional force required for a reliable operating device 50.

An apertured molecular sieve 105 is disposed on the apertured expandable metal ring 104. The outer periphery of the molecular sieve 105 conforms to the inner periphery of the upwardly extending cylindrical member 66.

The device 50 is completed by providing a hermetic enclosure for the semiconductor element 78. This hermetic enclosure is formed by affixing an apertured header assembly 106 to the member 66. The header assembly 106 comprises an outwardly extending flanged member 108 affixed to an apertured insulating seal member 110.

The header assembly 106 is joined to the member 66 by welding the outwardly extending flanged member 108 to the annular weld ring 74.

An electrical contact and thermal dissipating stud 112 is either affixed to, or is integral with, the support member 52. The stud 112 is used to connect the support member 52 to an electrical conductor and heat sink.

The pressure electrical contact assembly 10 enables one to employ an integral case and weld ring assembly, illustrated by the member 66, in order to produce a compact high-current controlled semiconductor device. Since the internal height within such a device is limited, the leads must be offset from the vertical axis of the device in order to provide for the longest minimum electrical leakage path over the ceramic surface between conductor leads for the surface available and yet retain the centering of the contacts on the semiconductor element. Also, the assembly 10 provides an allowance for thermal and mechanical stresses which are more pronounced in compact semiconductor devices similar to the device 50.

While the invention has been described with reference to particular embodiments and examples, it will be understood, of course, that modifications, substitutions, and the like may be made therein without departing from its scope.

What we claim is:

1. A pressure electrical contact assembly comprising a first electrical lead affixed to a first electrical contact;

a second electrical lead affixed to a second electrical contact;

at least one portion of said second electrical lead comprising a hollow member;

a portion of said first lead passing through an aperture in one end of said hollow member, transversing the entire axial length of said member, exiting through an aperture in the other end of said hollow member, and terminating in said first electrical contact;

each remaining portion of said first and said second electrical leads having a vertical axis horizontally displaced from the vertical axes of the coaxial portions of said first and said second electrical leads and from each other;

an electrically conductive plate member affixed to the said one end of said hollow member;

an offset member connecting the plate member and the horizontally displaced portion of said second electrical lead; and a resilient means disposed within said hollow member to act upon said first contact.

2. The pressure electrical contact asembly of claim 1 in which a body of electrically insulating material is disposed within the hollow member, said body of electrically insulating material having an aperture therein centrally disposed relative to the bore of the hollow member, the first electrical lead extending downwardly through the aperture of said body before terminating in the first electrical contact.

3. The pressure electrical contact assembly of claim 2 in which the body of electrically insulating material comprises a material selected from the group consisting of polytetrafluoroethylene, polytrifluoromonochloroethylene, alumina, and epoxy resin.

4. The pressure electrical contact assembly of claim 1 in which said offset member is an integral stress relief member.

5. A semiconductor device comprising (1) a body of semiconductor material having at least three regions of semiconductivity, (2) a first electrical lead connected to a first region of semiconductivity, (3) a second electrical lead connected to a second region of semiconductivity, said second electrical lead comprising a hollow member, one end of said hollow member being in electrical contact with said second region of semiconductivity of said body of semiconductor material, the vertical axis of said hollow member being axially aligned with the vertical axis of said body, an electrically conductive plate member affixed to the opposite end of said hollow member, an electrically conductive offset member affixed to, and joining, said plate member to the remainder of said lead, said remainder extending vertically upward from said offset member, the longitudinal axis of the remainder of said lead being horizontally displaced from the vertical axis of said hollow member, said plate member having an aperture therein centrally disposed relative to the bore of said hollow member, (4) a third electrical lead comprising a first portion extending axially through said hollow member and the aperture of said plate member, said portion being connected to a third region of semiconductivity of said body and electrically insulated from said hollow member and said plate member, and a second portion extending along a vertical axis horizontally displaced from said first portion and the remainder of said second electrical lead, and a means for applying a constant pressure to the first portion of the third electrical lead to maintain the electrical contact between third electrical contact and said third region of semiconductivity of said body of semiconductor material.

6. The semiconductor device of claim 5 in which a body of electrically insulating material is disposed within the hollow member of the second electrical lead, said body of electrically insulating material having an aperture therein centrally disposed relative to the bore of the hollow member, an electrical contact connected to the third electrical lead, the third electrical lead extending downwardly through the aperture of said body of electrically insulating material before terminating in an electrical contact.

7. The semiconductor device of claim 6 in which the first portion of the third electrical lead extends downwardly through the aperture of said body of electrically insulating material before terminating in the electrical contact and the means for applying the force to maintain the electrical contact of the first portion of said third electrical lead in electrical contact with the third region of semiconductivity of the body of semiconductor material is a resilient means disposed within the hollow member between, and in contact with, the plate member and the body of electrically insulating material.

8. The semiconductor device of claim 5 in which said offset member is an integral stress relief member.

References Cited

UNITED STATES PATENTS

| | | | |
|---|---|---|---|
| 3,337,781 | 8/1967 | Ferree | 317—234 |
| 3,155,885 | 11/1964 | Marino et al. | 317—234 |
| 3,192,454 | 6/1965 | Rosenheinrich et al. | 317—234 |
| 3,218,524 | 11/1965 | Reintgen et al. | 317—234 |

| | | | |
|---|---|---|---|
| 3,252,060 | 5/1966 | Marino et al. | 317—234 |
| 3,296,506 | 1/1967 | Steinmetz et al. | 317—234 |

FOREIGN PATENTS

| | | |
|---|---|---|
| 980,555 | 1/1965 | Great Britain. |
| 241,727 | 11/1962 | Austria. |
| 895,326 | 5/1962 | Great Britain. |
| 1,381,184 | 10/1964 | France. |

JOHN W. HUCKERT, *Primary Examiner.*

J. R. SHEWMAKER, *Assistant Examiner.*

U.S. Cl. X.R.

317—234